United States Patent
Fernald et al.

(10) Patent No.: US 6,229,827 B1
(45) Date of Patent: May 8, 2001

(54) COMPRESSION-TUNED BRAGG GRATING AND LASER

(75) Inventors: Mark R. Fernald, Enfield, CT (US); Timothy J. Bailey, Longmeadow, MA (US); Matthew B. Miller, Glastonbury, CT (US); James M. Sullivan, Manchester, CT (US); Michael A. Davis, Glastonbury, CT (US); Robert N. Brucato, Waterbury, CT (US); Martin A. Putnam, Cheshire, CT (US); Alan D. Kersey, South Glastonbury, CT (US); Paul E. Sanders, Madison, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/456,112

(22) Filed: Dec. 6, 1999

Related U.S. Application Data

(63) Continuation-in-part of application No. 09/400,362, filed on Sep. 20, 1999, which is a continuation-in-part of application No. 09/205,846, filed on Dec. 4, 1998.

(51) Int. Cl.[7] ........................................................... H01S 3/10
(52) U.S. Cl. ..................................... 372/20; 372/6; 372/64
(58) Field of Search .............................. 372/20, 64, 92, 372/6; 385/37, 24; 359/568, 569

(56) References Cited

U.S. PATENT DOCUMENTS

| | | | |
|---|---|---|---|
| 4,636,031 | 1/1987 | Schmadel, Jr. et al. | 350/96.19 |
| 4,915,467 | 4/1990 | Berkey | 350/96.15 |
| 5,007,705 | 4/1991 | Morey et al. | 350/96.29 |

(List continued on next page.)

FOREIGN PATENT DOCUMENTS

| | | | |
|---|---|---|---|
| 19724528 | 12/1998 | (DE) | G02B/6/34 |
| 0359351 | 9/1992 | (EP) | C03B/37/15 |
| 305004 | 6/1997 | (NO) . | |

(List continued on next page.)

OTHER PUBLICATIONS

M.G. Xu, . Geiger and J. P. Dakin for "Fibre grating pressure sensor with enhanced sensitivity using a glass–bubble housing"—Electronic Letters—18th Jan. 1996, vol. 32, No. 2.

Quartzdyne, Inc., Series QU/QG Spec Specification Sheet and p. 6, Section 1, General Information taken from Quartzdyne Pressure Transducers General Catalog and Operating Manual for Quartzdyne Downhole High Pressure Transducers (Series QU, QG, QL, TMC, IXP and LP) Apr. 1, 1997.

(List continued on next page.)

*Primary Examiner*—Leon Scott, Jr.

(57) ABSTRACT

A compression-tuned bragg grating includes a tunable optical element 20,600 which includes either an optical fiber 10 having at least one Bragg grating 12 impressed therein encased within and fused to at least a portion of a glass capillary tube 20 or a large diameter waveguide grating 600 having a core and a wide cladding. Light 14 is incident on the grating 12 and light 16 is reflected at a reflection wavelength $\lambda 1$. The tunable element 20,600 is axially compressed which causes a shift in the reflection wavelength of the grating 12 without buckling the element. The shape of the element may be other geometries (e.g., a "dogbone" shape) and/or more than one grating or pair of gratings may be used and more than one fiber 10 or core 612 may be used. At least a portion of the element may be doped between a pair of gratings 150,152, to form a compression-tuned laser or the grating 12 orgratings 150,152 may be constructed as a tunable DFB laser. Also, the element 20 may have an inner tapered region 22 or tapered (or fluted) sections 27. The compression may be done by a PZT, stepper motor or other actuator or fluid pressure.

48 Claims, 6 Drawing Sheets

U.S. PATENT DOCUMENTS

| | | | |
|---|---|---|---|
| 5,042,898 | 8/1991 | Morey et al. | 385/37 |
| 5,235,659 | 8/1993 | Atkins et al. | 385/124 |
| 5,367,589 | 11/1994 | MacDonald et al. | 385/37 |
| 5,399,854 | 3/1995 | Dunphy et al. | 250/227.17 |
| 5,469,520 | 11/1995 | Morey et al. | 385/37 |
| 5,511,083 | 4/1996 | D'Amato et al. | 372/6 |
| 5,512,078 | 4/1996 | Griffin | 65/484 |
| 5,578,106 | 11/1996 | Fleming, Jr. et al. | 65/391 |
| 5,682,453 | 10/1997 | Daniel et al. | 385/99 |
| 5,684,297 | 11/1997 | Cable | 250/227.14 |
| 5,691,999 | 11/1997 | Ball et al. | 373/20 |
| 5,699,377 | 12/1997 | Jing-Jong Pna | 372/92 |
| 5,745,626 | 4/1998 | Duck et al. | 385/96 |
| 5,771,251 | 6/1998 | Kringlebotn et al. | 372/6 |
| 5,841,131 | 11/1998 | Schroeder et al. | 250/227.17 |
| 5,844,927 | 12/1998 | Kringlebotn et al. | 372/6 |
| 5,999,546 | 12/1999 | Espindola et al. | 372/20 |

FOREIGN PATENT DOCUMENTS

| | | | |
|---|---|---|---|
| WO82/4328 | 12/1982 | (WO) | G02B/5/172 |
| WO95/30926 | 11/1995 | (WO) | G02F/2/02 |
| WO9932911 | 3/1998 | (WO) | |
| WO98/59267 | 12/1998 | (WO) | G02B/5/18 |
| WO9944026 | 2/1999 | (WO) | |

OTHER PUBLICATIONS

"The Thickness–Shear Quartz Resonator: A Rugged, Precision Pressure Transducer" Product Feature from Sensors, Jul. 1990.

"Design of DFB fibre lasers", V. C. Lauridsen et al, Electron. Lett., vol. 34, No. 21, pp. 2028–2030, 1998.

"Erbium doped fibre DFB laser with permanent $\pi/2$ phase–shift induced by UV post–processing", P. Varming et al, IOOC 95 Tech. Digest, vol. 5, PDI–3, 1995.

Cruz, et al. Improved thermal sensitivity of fibre Bragg gratings using a polymer overlayer Electronics Letters 15th Feb. 1996 vol. 32, No.4.

Lo, Yu Lung "Using in–fiber Bragg–grating sensors for measuring axial strain and temperature simultaneously on surfaces of structures"Opt.Eng. 37(8) 2272–2276, Aug. 1998.

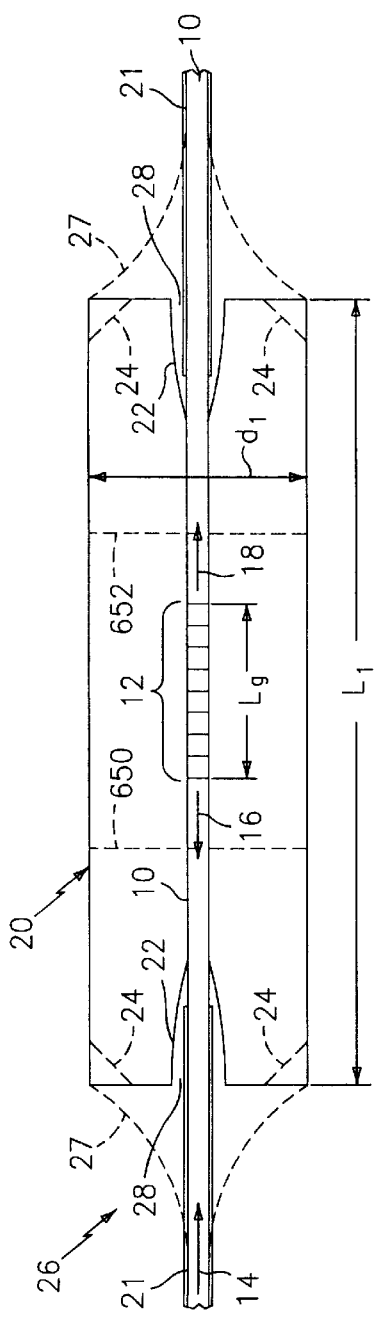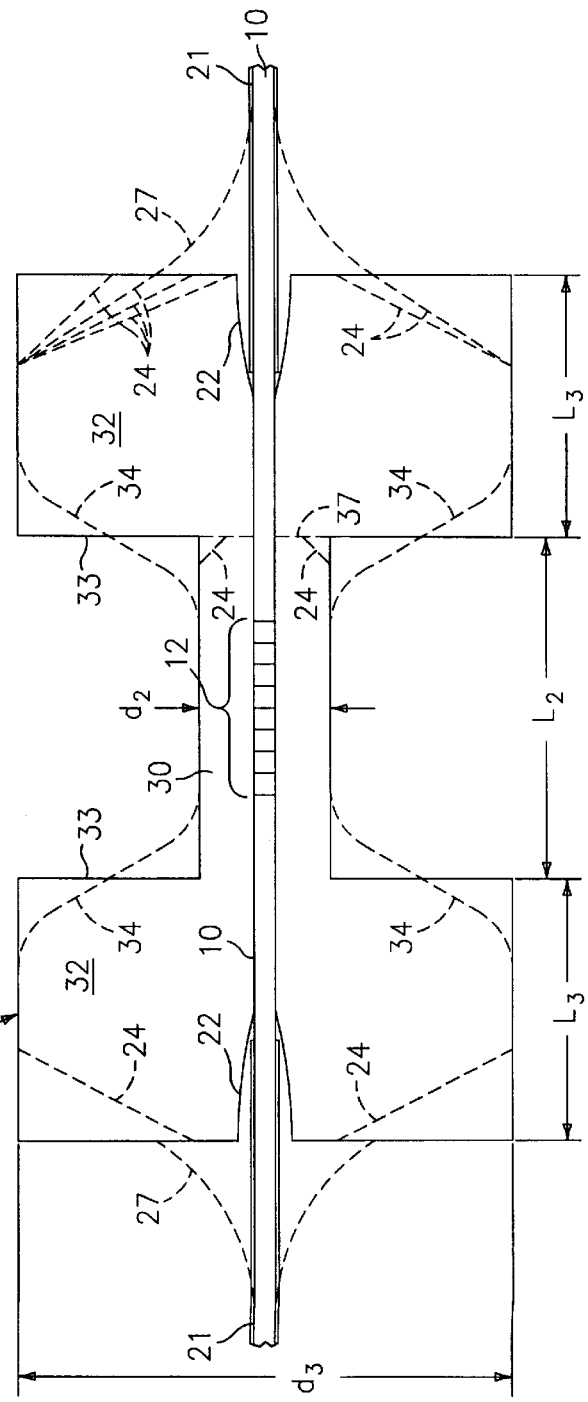

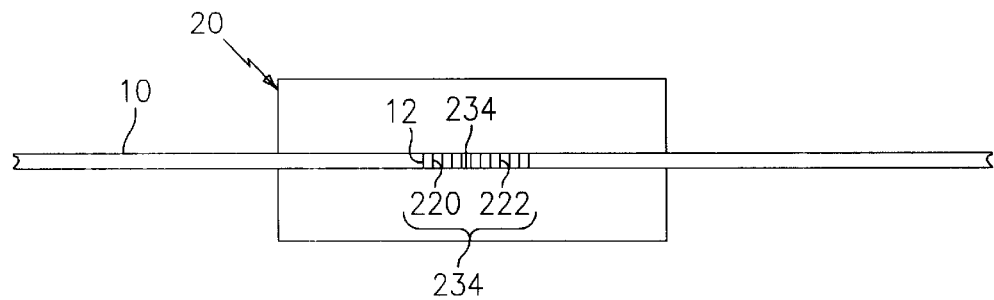
FIG. 13
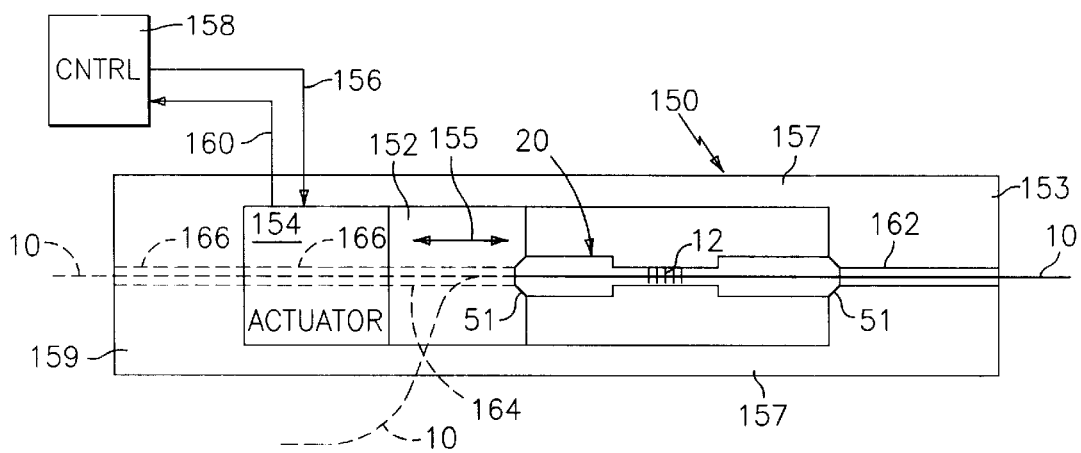
FIG. 14
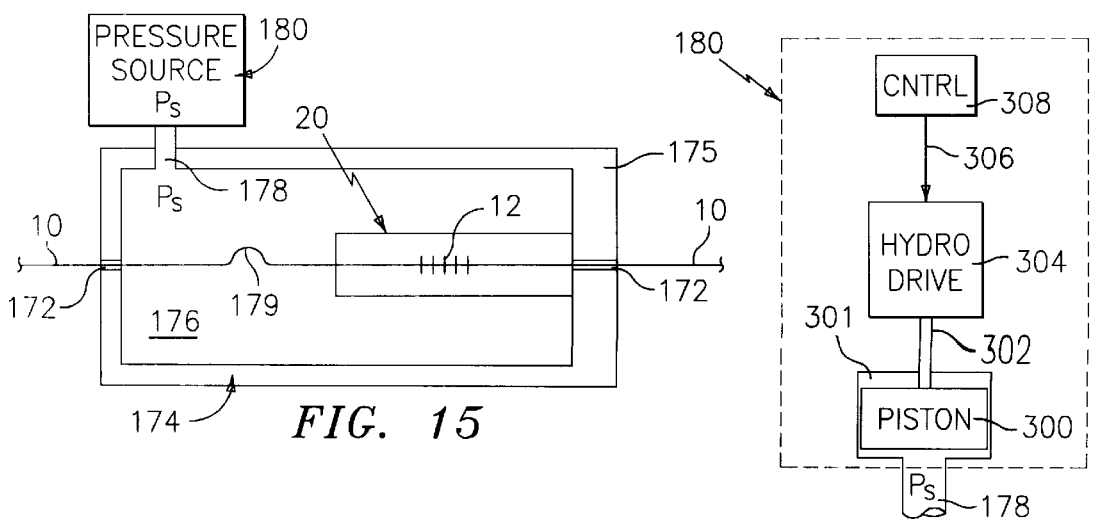
FIG. 15
FIG. 16

COMPRESSION-TUNED BRAGG GRATING AND LASER

CROSS REFERENCES TO RELATED APPLICATIONS

This is a continuation-in-part of U.S. patent application Ser. No. 09/400,362 filed Sep. 20, 1999, which is a continuation-in-part of U.S. patent application Ser. No. 09/205,846, filed Dec. 4, 1998. Also, copending U.S. patent applications Ser. No. 09/455,867, entitled "Bragg Grating Pressure Sensor", Ser. No. 09/455,865, entitled "Tube-Encased Fiber Grating", and Ser. No. 09/455,868, entitled "Large Diameter Optical Waveguide, Grating and Laser" all filed contemporaneously herewith, contain subject matter related to that disclosed herein.

TECHNICAL FIELD

This invention relates to fiber gratings, and more particularly to a compression-tuned Bragg grating and laser.

BACKGROUND ART

It is known in the art of fiber optics that Bragg gratings embedded in the fiber may be used in compression to act as a tunable filter or tunable fiber laser, as is described in U.S. Pat. No. 5,469,520, entitled "Compression Tuned Fiber Grating" to Morey, et al and U.S. Pat. No. 5,691,999, entitled "Compression Tuned Fiber Laser" to Ball et al., respectively, which are hereby incorporated herein by reference.

To avoid fiber buckling under compression, the technique described in the aforementioned U.S. Pat. Nos. 5,469,520 and 5,691,999 uses sliding ferrules around the fiber and grating and places the ferrules in a mechanical structure to guide, align and confine the ferrules and the fiber. However, it would be desirable to obtain a configuration that allows a fiber grating to be compressed without buckling and without sliding ferrules and without requiring such a mechanical structure.

Also, it is known to attach an optical fiber grating to within a glass tube to avoid buckling under compression for providing a wavelength-stable temperature compensated fiber Bragg grating as is described in U.S. Pat. No. 5,042,898, entitled "Incorporated Bragg Filter Temperature Compensated Optical Waveguide Device", to Morey et al. However, such a technique exhibits creep between the fiber and the tube over time, or at high temperatures, or over large compression ranges.

SUMMARY OF THE INVENTION

Objects of the present invention include provision of a fiber grating configuration that allows the grating to be compression-tuned without creep and without requiring sliding ferrules or a mechanical supporting structure for the ferrules.

According to the present invention, a compression-tuned optical device, comprises; a tunable optical element, having outer dimensions along perpendicular axial and transverse directions, the outer dimension being at least 0.3 mm along the transverse direction; the tunable optical element receiving and propagating input light and having at least one reflective element disposed therein along the axial direction, the reflective element reflecting a reflection wavelength of the input light; at least a portion of the tunable element having a transverse cross-section which is contiguous and comprises a substantially homogeneous material; and the reflective element being axially strain compressed so as to change the reflection wavelength without buckling the tunable element in the transverse direction.

According further to the present invention, the tunable element comprises an optical fiber, having the reflective element embedded therein; and a tube, having the optical fiber and the reflective element encased therein along a longitudinal axis of the tube, the tube being fused to at least a portion of the fiber. According further to the present invention the tunable element comprises a large diameter optical waveguide having an outer cladding and an inner core disposed therein and an outer waveguide diameter of at least 0.3 mm.

According still further to the present invention the material is a glass material. According still further to the present invention the tube is fused to the optical fiber where the reflective element is located. According still further to the present invention the a plurality of the optical fibers or cores disposed in the tunable element. According still further to the present invention, the tunable element has a plurality of reflective elements encased in the tube. According still further to the present invention, the tunable element has at least one pair of reflective elements disposed therein and at least a portion of the tunable element is doped with a rare-earth dopant between the pair of elements to form a laser. According still further to the present invention, the laser lases at a lasing wavelength which changes as force on the tube changes.

The present invention provides a Bragg grating disposed in a tunable optical element which includes either an optical fiber fused to at least a portion of a glass capillary tube ("tube encased grating") or a large diameter waveguide grating having an optical core and a wide cladding. The tunable element is placed in compression to tune the reflection wavelength of the grating without buckling the element.

The element may be made of a glass material, such as silica or other glasses. The tunable element may have alternative geometries, e.g., a dogbone shape, that provides enhanced force to wavelength shift sensitivity and is easily scalable for the desired sensitivity. The present invention allows a fiber grating or laser to be wavelength tuned with very high repeatability, low creep and low hysteresis. Also, one or more gratings, fiber lasers, or a plurality of fibers or optical cores may be disposed in the tunable element.

The grating(s) or laser(s) may be "encased" in the tube by having the tube fused to the fiber on the grating area and/or on opposite axial ends of the grating area adjacent to or a predetermined distance from the grating. The grating(s) or laser(s) may be fused within the tube or partially within or to the outer surface of the tube. Also, one or more wavguides and/or the tube encased fiber/gratings may be axially fused and optically coupled to form the tunable element.

The foregoing and other objects, features and advantages of the present invention will become more apparent in light of the following detailed description of exemplary embodiments thereof.

BRIEF DESCRIPTION OF THE DRAWINGS

FIG. 4 is a side view of a tube-encased fiber grating, in accordance with the present invention.

FIG. 5 is a side view of a tube-encased fiber grating having an alternative geometry for the tube, in accordance with the present invention.

FIG. 13 is a side view of a tunable distributed feedback (DFB) fiber laser encased in a tube, in accordance with the present invention.

FIG. 14 is a side view of a device for compressing a tube-encased fiber grating using an actuator to tune the grating, in accordance with the present invention.

FIG. 15 is a side view of a device for compressing a tube-encased fiber grating using a precise pressure source to tune the grating, in accordance with the present invention.

FIG. 16 is a side view of a device for compressing a tube-encased fiber grating using a precise pressure source to tune the grating, in accordance with the present invention.

BEST MODE FOR CARRYING OUT THE INVENTION

Figure 1:
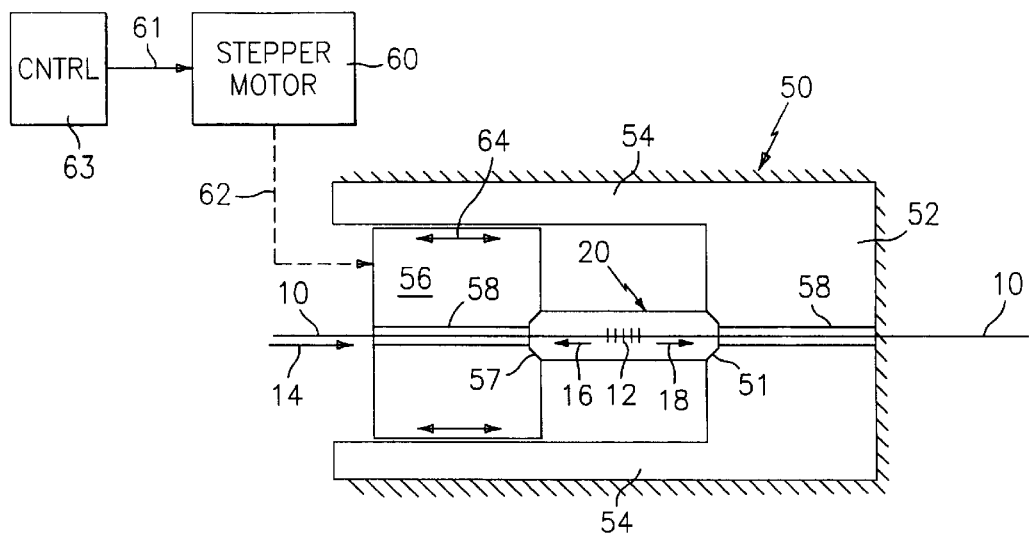
FIG. 1 is a side view of a device for compressing a tube-encased fiber grating, in accordance with the present invention.

Referring to FIG. 1, a compression-tuned bragg grating comprises a known optical waveguide 10, e.g., a standard telecommunication single mode optical fiber, having a Bragg grating 12 impressed (or embedded or imprinted) in the fiber 10. The fiber 10 has an outer diameter of about 125 microns and comprises silica glass ($SiO_2$) having the appropriate dopants, as is known, to allow light 14 to propagate along the fiber 10. The Bragg grating 12, as is known, is a periodic or a periodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming A periodic Gratings in Optical Fibers", to Glenn, which are hereby incorporated by reference to the extent necessary to understand the present invention.

However, any wavelength-tunable grating or reflective element embedded, etched, imprinted, or otherwise formed in the fiber 28 may be used if desired. As used herein, the term "grating" means any of such reflective elements. Further, the reflective element (or grating) 12 may be used in reflection and/or transmission of light.

Other materials and dimensions for the optical fiber or waveguide 10 may be used if desired. For example, the fiber 10 may be made of any glass, e.g., silica, phosphate glass, or other glasses, or made of glass and plastic, or solely plastic. For high temperature applications, optical fiber made of a glass material is desirable. Also, the fiber 10 may have an outer diameter of 80 microns or other diameters. Further, instead of an optical fiber, any optical waveguide may be used, such as, a multi-mode, birefringent, polarization maintaining, polarizing, multi-core, or multi-cladding optical waveguide, or a flat or planar waveguide (where the waveguide is rectangular shaped), or other waveguides. As used herein the term "fiber" includes the above described waveguides.

The light 14 is incident on the grating 12 which reflects a portion thereof as indicated by a line 16 having a predetermined wavelength band of light centered at a reflection wavelength $\lambda b$, and passes the remaining wavelengths of the incident light 14 (within a predetermined wavelength range), as indicated by a line 18.

The fiber 10 with the grating 12 therein is encased within and fused to at least a portion of a cylindrical glass capillary tube 20, discussed more hereinafter. The tube 20 is axially compressed by a compressing device or housing 50. One end of the tube 20 is pressed against a seat 51 in an end 52 of the housing 50. The housing 50 also has a pair of arms (or sides) 54 which guide a movable block 56. The block 56 has a seat 57 that presses against the other end of the tube 20. The end 52 and the block 56 have a hole 58 drilled through them to allow the fiber 10 to pass through. An actuator 60, such as a stepper motor or other type of motor whose rotation or position can be controlled, is connected by a mechanical linkage 62, e.g., a screw drive, linear actuator, gears, and/or a cam, to the movable block 56 (or piston) which causes the block 56 to move as indicated by arrows 64. Accordingly, the stepper motor 60 can set a predetermined amount of force on the block to compress the tube 20 to provide a desired reflection wavelength of the grating 12. Instead of the recessed seats 51,57, the tube 20 may contact the ends 52,56 with a flush contact. The stepper motor 60 may be a high resolution stepper motor driven in a microstepping mode, such as that described in the aforementioned U.S. Pat. No. 5,469,520, "Compression Tuned Fiber Grating", to Morey et al, (e.g., a Melles Griot NANOMOVER), incorporated herein by reference. Other higher or lower resolution stepper motors may be used if desired. The stepper motor 60 is driven by a control circuit 63 which provides drive signals on lines 61 needed to drive the stepper motor 60, and hence the block 56, to the desired position, to provide the desired Bragg wavelength $\lambda b$ of the grating 12. Instead of a stepper motor, other actuators may be used if desired, as discussed hereinafter with FIG. 14.

Figure 2:
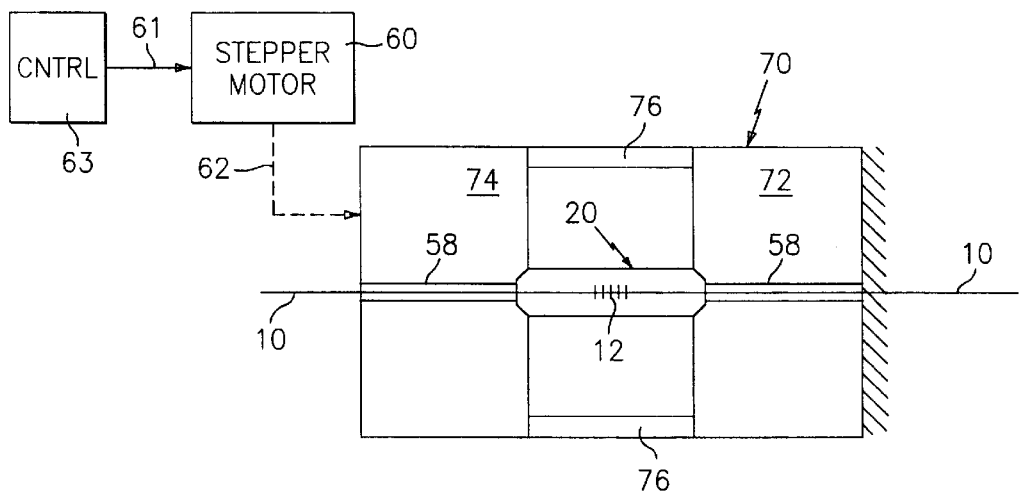
FIG. 2 is a side view of an alternative device for compressing a tube-encased fiber grating, in accordance with the present invention.

Referring to FIG. 2, instead of using the movable block 56, a housing 70 may be used which has two end caps 72,74 and outside walls 76. In that case, the holes 58 are in the end caps 72,74 to allow the fiber 10 to exit. The stepper motor 62 is connected to the end cap 74 by the mechanical linkage 62. When the stepper motor 62 pushes on the end cap 74, the walls 76 compress or deflect, the tube 20 is compressed and the reflection wavelength of the grating 12 shifts.

Figure 3:
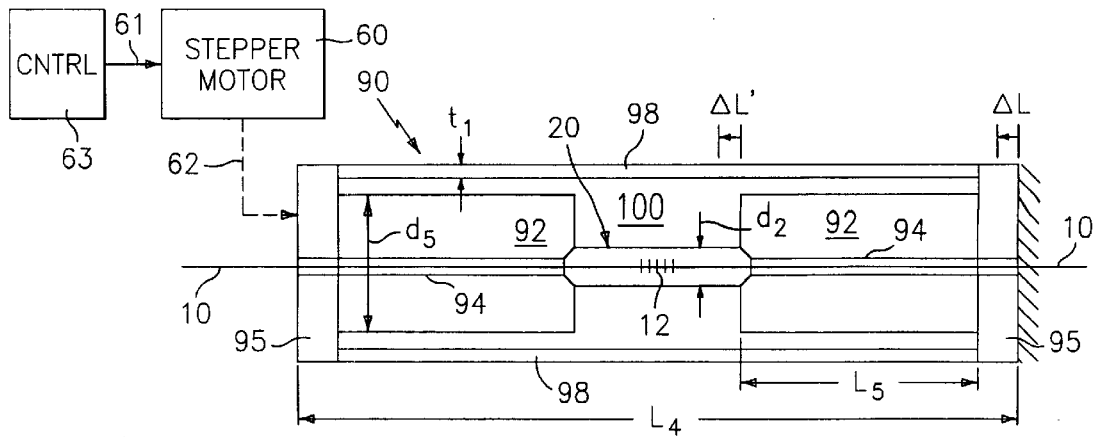
FIG. 3 is a side view of an alternative device for compressing a tube-encased fiber grating, in accordance with the present invention.

Referring to FIG. 3, another embodiment of the present invention, comprises a cylindrical-shaped housing 90 comprising an outer cylindrical wall 98, two end caps 95, and two inner cylinders (or pistons) 92 each connected at one end to one of the end caps 95. The tube 20 (with the grating 12 encased therein) is disposed against the other ends of and between the two pistons 92. Other cross-sectional and/or side-view sectional shapes may be used for the housing 90 dements 98,95,92 if desired. The end caps 95 may be separate pieces or part of and contiguous with the pistons 92 and/or the outer cylinder 98.

The stepper motor 60 applies an external axial force on the end cap 95 on the left side of the housing 90. The pistons 92 have holes 94 having a diameter large enough to allow the fiber 10 pass through.

Between the inside dimension of the walls 98 and the outside dimension of tube 20 and pistons 92 is an inner I-shaped chamber 100. The pistons 92, the outer cylinder walls 98, the end caps 95, and the tube 20 may be made of the same or different materials.

An example of some possible dimensions for the housing 90 are as follows. Other dimensions may be used. The tube 20 has the outer diameter d2 of about 2 mm (0.07 inches) and a length L1 of about 12.5 mm (0.5 in.), the pistons 92 each have outer diameters d5 of about 19.1 mm (0.75 inches), the length L5 of each of the pistons 92 is about 6.25 cm (2.5 in.), the diameter of the holes 94 in the pistons 92 is about 1 mm (1000 microns), the overall length L4 of the housing 90 is about 12.7 cm (5 inches), the thickness t1 of the outside walls 98 is about 1.0 mm (0.04 inches), and the gap g1 between the inner dimension of the outer walls 98 and the outer dimensions of the pistons 92 is about 1.52 mm (0.06 inches).

The dimensions, materials, and material properties (e.g., Poisson's ratio, Young's Modulus, Coefficient of Thermal Expansion, and other known properties), of the walls 98 and the pistons 92 are selected such that the desired strain is delivered to the capillary tube 20 at an external force. The resolution and range for setting the reflection wavelength are scalable by controlling these parameters. For example, if the overall length L4 is increased, the sensitivity $\Delta L/L$ will increase.

In particular, as the axial force from the stepper motor increases, the axial length L4 of the housing 90 decreases by an amount $\Delta L$ due to compression and/or deflection of the outer walls 98. A predetermined portion of the total axial length change $\Delta L'$ is seen at the tube 20 due to compression of the tube 20. Compression of the tube 20 lowers the Bragg reflection wavelength $\lambda 1$ of the grating 12 by a predetermined amount which provides a wavelength shift. If the pistons 92 have a spring constant higher than that of the glass tube 20, the tube 20 will be compressed more than the pistons 92 for a given force. Also, for a given external force, a predetermined amount of the force is dropped across the outside walls 98, and the remainder is seen by the tube 20.

For example, when the walls 98, pistons 92 and end caps 95 are all made of titanium having the dimensions discussed hereinbefore, for an external force of 2200 lbf, about 2000 lbf is dropped across (or used to compress/deflect) the outside walls 98, and about 200 lbf is dropped across the tube 20. The cylinder walls 98 act similar to a diaphragm or bellows which compress or deflect due to increased external pressure.

The housing 90 may be assembled such that a pre-strain or no pre-stain exists on the tube 20 prior to applying any outside forces.

The material of the housings 50,70, 90 and/or one or more of the components thereof, may be made of a metal such as titanium, high nickel content alloys such as Inconel®, Incoloy®, Nimonic® (registered trademarks of Inco Alloys International, Inc.) containing various levels of Nickel, Carbon, Chromium, Iron, Molybdenum, and Titanium, stainless steel, a glass material (such as discussed hereinafter for the tube 20), or other high strength, or corrosion resistant, or high temperature or heat resistant metals or alloys may be used, or other materials having sufficient strength to compress the tube 20 may be used. Other materials having other properties may be used if desired depending on the application.

Referring to FIG. 14, alternatively, instead of using a stepper motor as the actuator, the tube 20 may be compressed by another actuator 154, such as a peizoelectric actuator, solenoid, pneumatic force actuator, or any other device which is capable of directly or indirectly applying an axial compressive force on the tube 20 may be used. The actuator 154 may be disposed on a housing 150 (analogous to the frame 50; FIG. 1) and creates a force on a movable block 152 (analogous to the movable block 56; FIG. 1) which moves in the direction of the arrows 155.

One end of the tube 20 is pressed against the seat 51 in an end 153 of the housing 150. The housing 150 also has a pair of sides 157 which guide the movable block 152. One of the sides 157 may be removed if desired. The block 152 has the seat 57 that presses against the other end of the tube 20.

Also, the actuator 154 is connected to a control circuit 158 which provides the necessary signals on a line 156 to the actuator 154 to set the desired force on the tube 20 which sets the desired Bragg wavelength $\lambda b$ of the grating 12. The force may be set by the controller 158 by providing a signal (e.g., an electrical voltage) on the line 156 to the actuator 154 in an open loop configuration. Alternatively, the force may be set on the actuator 154 by providing a signal on the line 156 to the actuator 154 and measuring the force or position of the actuator 154 on a line 160 in a closed loop control configuration on the actuator 154.

For single ended operation, the fiber 10 may enter on one end of the housing 150 and pass through a hole 162 in the end 153. If a feed-through (double ended fiber) design is used, the block 152 may have a hole 164 part or all the way through it, and the other end of the fiber 10 may be fed out the side or passed through a hole 166 in the actuator 154 and in the other end of the housing 150.

One example of a closed loop piezoelectric actuator that may be used is Model No. CM (controller) and DPT-C-M (for a cylindrical actuator) made by Queensgate, Inc. of New York. Other actuators may be used, as discussed hereinbefore.

Referring to FIG. 15, alternatively, the tube 20 may be placed in a housing 174, and the grating wavelength set by placing a fluid pressure on the tube 20, similar to a pressure sensor described in co-pending U.S. patent application Ser. No. 09/455,867, entitled "Bragg Grating Pressure Sensor", filed Dec. 6, 1999, which is incorporated herein by reference, and the tube 20 may have any of the geometries and configurations described in such patent application. The housing 172 creates a chamber 176 and has a port 178 that is fed to a pressure source 180, which provides a precise source pressure Ps. The chamber 176 may be filled with a fluid (e.g., one or more gasses and/or liquids). The tube 20 may be mounted to one wall 175 or may be suspended in the fluid 176. The optical fiber 10 is fed into the chamber through a known hermetic feedthroughs and has some slack 179 to allow for compression of the tube 20 over pressure. The grating reflection wavelength changes as the pressure Ps changes, similar to the actuator embodiments discussed hereinbefore; however, in this case, the grating wavelength is set by setting a predetermined source fluid pressure Ps.

Referring to FIG. 16, for example, the pressure source 180 may comprise a hydraulic actuator or piston 300 disposed within a chamber 301. The piston 300 is connected by a mechanical linkage 302 to a known hydraulic drive mechanism 304 which precisely sets the position of the piston 300 to set the pressure Ps. The hydraulic drive 304 may be controlled electronically by a known control circuit 308, similar to the controller 158 (FIG. 14), which provides a position command signal on a line 306 to the hydraulic controller 304 for a particular piston position and thus pressure Ps, and thus wavelength λb of the grating. Other known pressure sources may be used if desired to set the grating wavelength. The housings described herein 50,150, 70,90, and any components therein, including the movable blocks 56,152, may have a circular cross-section (i.e., cylindrical shape) or may have other cross-sectional shapes, such as square, rectangular, or other shapes.

Although the invention has been described with some specific embodiments with FIGS. 1–3,14,15 for compressing the tube 20, any device or fixture which compresses the tube axially may be used for compressing the tube 20 to tune the reflection wavelength of the grating 12 to the desired wavelengths. The exact hardware configuration is not critical to the present invention.

For any of the embodiments described herein, the axial end faces of the tube 20 and/or the seats on mating surfaces (56,50,92,74,72,153,159) may be plated with a material that reduces stresses or enhances the mating of the tube 20 with the seat on the mating surfaces. Referring to FIG. 4, the tube 20 may have an outer diameter d1 of about 3 mm and a length L1 of about 10–30 mm. The grating 12 has a length Lg of about 3 to 40 mm. Alternatively, the length L1 of the tube 20 may be substantially the same length as the length Lg of the grating 12, such as by the use of a longer grating, or a shorter tube. Other dimensions and lengths for the tube 20 and the grating 12 may be used. Also, the fiber 10 and grating 12 need not be fused in the center of the tube 20 but may be fused anywhere in the tube 20. Also, the tube 20 need not be fused to the fiber 10 over the entire length of the tube 20.

The dimensions and geometries for any of the embodiements described herein are merely for illustrative purposes and, as such, any other dimensions may be used if desired, depending on the application, size, performance, manufacturing requirements, or other factors, in view of the teachings herein.

The tube 20 is made of a glass material, such as natural or synthetic quartz, fused silica, silica ($SiO_2$), Pyrex® by Corning (boro silicate), or Vycor® by Corning Inc. (about 95% silica and 5% other constituents such as Boron Oxide), or other glasses. The tube should be made of a material such that the tube 20 (or the inner diameter surface of a bore hole in the tube 20) can be fused to (i.e., create a molecular bond with, or melt together with) the outer surface (or cladding) of the optical fiber 10 such that the interface surface between the inner diameter of the tube 20 and the outer diameter of the fiber 10 become substantially eliminated (i.e., the inner diameter of the tube 20 cannot be distinguished from and becomes part of the cladding of the fiber 10).

For best thermal expansion matching of the tube 20 to the fiber 10 over a large temperature range, the coefficient of thermal expansion (CTE) of the material of the tube 20 should substantially match the CTE of the material of the fiber 10, e.g., fused silica tube and optical fiber. In general, the lower the melting temperature of the glass material, the higher the CTE. Thus, for a silica fiber (having a high melting temperature and low CTE) and a tube made of another glass material, such as Pyrex® or Vycor® (having a lower melting temperature and higher CTE) results in a thermal expansion mismatch between the tube 20 and the fiber 10 over temperature. However, it is not required for the present invention that the CTE of the fiber 10 match the CTE of the tube 20 (discussed more hereinafter).

Instead of the tube 20 being made of a glass material, other elastically deformable materials may be used provided the tube 20 can be fused to the fiber 10. For example, for an optical fiber made of plastic, a tube made of a plastic material may be used.

The axial ends of the tube 20 where the fiber 10 exits the tube 20 may have an inner region 22 which is inwardly tapered (or flared) away from the fiber 10 to provide strain relief for the fiber 10 or for other reasons. In that case, an area 28 between the tube 20 and the fiber 10 may be filled with a strain relief filler material, e.g., polyimide, silicone, or other materials. Also, the tube 20 may have tapered (or beveled or angled) outer corners or edges 24 to provide a seat for the tube 20 to mate with another part (not shown) and/or to adjust the force angles on the tube 20, or for other reasons. The angle of the beveled corners 24 are set to achieve the desired function. The tube 20 may have cross-sectional shapes other than circular, such as square, rectangular, elliptical, clam-shell, or other shapes, and may have side-view sectional shapes other than rectangular, such as circular, square, elliptical, clam-shell, or other shapes.

Alternatively, instead of having the inner tapered axial region 22, one or both of the axial ends of the tube 20 where the fiber 10 exits the tube 20 may have an outer tapered (or fluted, conical, or nipple) axial section, shown as dashed lines 27, which has an outer geometry that decreases down to the fiber 10 (discussed more hereinafter with FIG. 12). We have found that using the fluted sections 27 provides enhanced pull strength at and near the interface where the fiber 10 exits the tube 20, e.g., 6 lbf or more, when the fiber 10 is pulled along its longitudinal axis.

Where the fiber 10 exits the tube 20, the fiber 10 may have an external protective buffer layer 21 to protect the outer surface of the fiber 10 from damage. The buffer 21 may be made of polyimide, silicone, Teflon® (polytetraflouroethylene), carbon, gold, and/or nickel, and have a thickness of about 25 microns. Other thicknesses and buffer materials for the buffer layer 21 may be used. If the inner tapered region 22 is used and is large enough, the buffer layer 21 may be inserted into the region 22 to provide a transition from the bare fiber to a buffered fiber. Alternatively, if the axial end of the tube 20 has the external taper 27, the buffer 21 would begin where the fiber exits the tapered 27 portion of the tube 20. If the buffer 21 starts after the fiber exit point, the exposed bare portion of the fiber 10 may be recoated with an additional buffer layer (not shown) which covers any bare fiber outside of the tube 20 and may also overlap with the buffer 21 and/or some of the tapered region 27 or other geometrically shaped axial end of the tube 20.

To encase the fiber 10 within the tube 20, the tube 20 may be heated, collapsed, and fused to the grating 12, by a laser, filament, flame, etc., as is described in copending U.S. patent application Ser. No. 09/455,865, entitled "Tube-Encased Fiber Grating", which is incorporated herein by reference. Other techniques may be used for collapsing and fusing the tubes 20 to the fiber 10, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques.

Alternatively, other techniques may be used to fuse the fiber 10 to the tube 20, such as using a high temperature glass solder, e.g., a silica solder (powder or solid), such that the fiber 10, the tube 20 and the solder all become fused to each other, or using laser welding/fusing or other fusing techniques. Also, the fiber may be fused within the tube or partially within or on the outer surface of the tube (discussed hereinafter with FIG. 11).

The Bragg grating 12 may be impressed in the fiber 10 before or after the capillary tube 20 is encased around and fused to the fiber 10, such as is discussed in copending U.S. patent application Ser. No. 09/455,865, which is incorporated herein by reference. If the grating 12 is impressed in the fiber 10 after the tube 20 is encased around the grating 12, the grating 12 may be written through the tube 20 into the fiber 10 by any desired technique, such as is described in copending U.S. patent application Serial No. 09/205,845, entitled "Method and Apparatus For Forming A Tube-Encased Bragg Grating", filed Dec. 4, 1998.

The grating 12 may be encased in the tube 20 having an initial pre-strain from the tube (compression or tension) or no pre-strain. For example, if Pyrex® or another glass that has a larger coefficient of thermal expansion (CTE) than that of the fiber 10 is used for the tube 20, when the tube 20 is heated and fused to the fiber and then cooled, the grating 12 is put in compression by the tube 20. Alternatively, the fiber grating 12 may be encased in the tube 20 in tension by putting the grating in tension during the tube heating and fusing process. In that case, when the tube 20 is compressed, the tension on the grating 12 is reduced. Also, the fiber grating 12 may be encased in the tube 20 resulting in neither tension nor compression on the grating 12 when no external forces are applied to the tube 20.

Referring to FIG. 5, the capillary tube 20 may have a varying geometry, depending on the application. For example, the tube 20 may have a "dogbone" shape having a narrow central section 30 and larger outer sections 32. The narrow section 30 has an outer diameter d2 of about 1 mm, and a length L2 of about 5 mm. The large sections 32 each have a diameter d3 of about 3 mm and a length L3 of about 4 mm. Other lengths and diameters of the sections 30,32 may be used. The dogbone shape may be used to provide increased sensitivity in converting force applied by the stepper motor 60 or actuator 154 to wavelength shift of the tube-encased grating 12.

An inner transition region 33 of the large sections 32 may be a sharp vertical or angled edge or may be curved as indicated by dashed lines 34. A curved geometry 34 has less stress risers than a sharp edge and thus may reduce the likelihood of breakage. Also, the sections 32 of the tube 20 may have the inner tapered regions 22 or the outer fluted sections 27 at the ends of the tube 20, as discussed hereinbefore. Further, the sections 32 may have the tapered (or beveled) outer corners 24 as discussed hereinbefore.

Also, it is not required that the dogbone geometry be symmetric, e.g., the lengths L3 of the two sections 32 may be different if desired. Alternatively, the dogbone may be a single-sided dogbone, where instead of the having the two larger sections 32, there may be only large section 32 on one side of the narrow section 30 and the other side may have a straight edge 37 which may have beveled corners 24 as discussed hereinbefore. In that case, the dogbone has the shape of a "T" on its side. Such a single-sided dogbone shall also be referred to herein as a "dogbone" shape. Instead of a dogbone geometry, other geometries that provide enhanced strain sensitivity or adjust force angles on the tube 20 or provide other desirable characteristics may be used.

We have found that such a dimension change between the dimension d3 of the large section 32 and the dimension d2 of the narrow section 30 provides increased force to grating wavelength shift sensitivity (or gain or scale factor) by strain amplification. Also, the dimensions provided herein for the dogbone are easily scalable to provide the desired amount of sensitivity.

Figure 6:
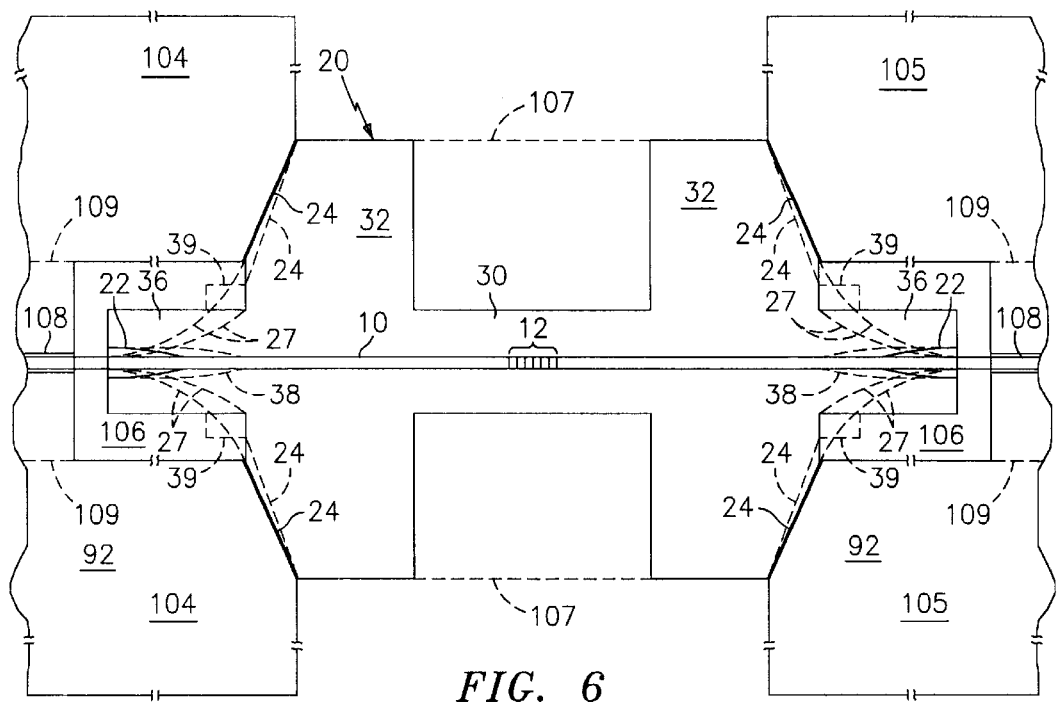
FIG. 6 is a side view of a tube-encased fiber grating having an alternative geometry for the tube, in accordance with the present invention.

Referring to FIG. 6, alternatively, to help reduce strain on the fiber 10 at the interface between the fiber 10 and the tube 20, the tube 20 may have sections 36 which extend axially along the fiber 10 and attach to the fiber 10 at a location that is axially outside where the force is applied on the large sections 32 by opposing end pieces 104,105, which are equivalent to the end pieces 56,50 (FIG. 1), 74,72 (FIG. 2), 159,153 (FIG. 14), respectively, or the pistons 92 (FIG. 3). The axial length of the sections 36 may be about 20 mm; however, longer or shorter lengths may be used depending on the application or design requirements. Also, the sections 36 need not be axially symmetrical, and need not be on both axial ends of the tube 20. The sections 32 may have the inner tapered regions 22 or the outer fluted sections 27 where the fiber interfaces with the tube 20, as discussed hereinbefore. Alternatively, there may be a stepped section 39 as part of the sections 36. In that case, the region 22 may be within or near to the stepped section 39 as indicated by dashed lines 38. The regions 106 may be air or filled with an adhesive or filler. Also, the tube 20 may have a straight constant cross-section as discussed hereinbefore and as indicated by the dashed lines 107 instead of a dogbone shape. Further, the hole 108 through the end pieces 56,50 (FIG. 1), 74,72 (FIG. 2), 152,150 (FIG. 14), respectively, or the pistons 92 (FIG. 3) may have a larger diameter as indicated by the dashed lines 109 for all or a portion of the length of the hole 108. The capillary tube 20 may have other axial extending geometries, such as is discussed in the aforementioned copending U.S. patent application Ser. No. 09/455,865. Also, more than one concentric tube may be used to form the tube 20 of the present invention, as discussed in the aforementioned copending U.S. patent application. Also, the axially extended sections 36 may be part of an inner tube.

Figure 7:
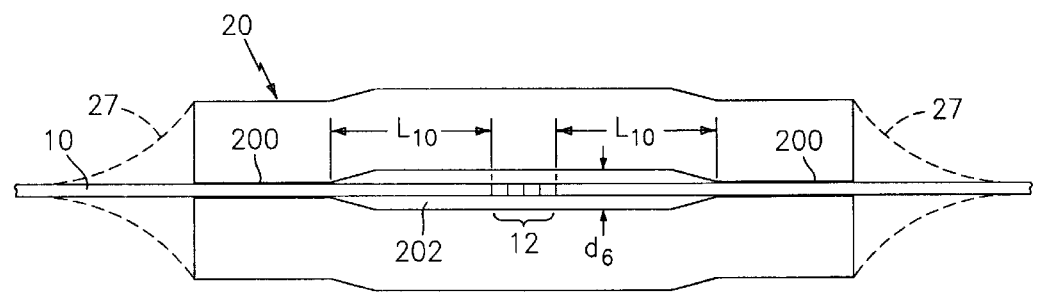
FIG. 7 is a side view of a tube-encased fiber grating where the tube is fused on opposite axial ends of the grating area, in accordance with the present invention.

Referring to FIG. 7, alternatively, the tube 20 may be fused to the fiber 10 on opposite sides of the grating 12. In particular, regions 200 of the tube 20 are fused to the fiber 10 and a central section 202 of the tube around the grating 12 is not fused to the fiber 10. The region 202 around the grating 12 may contain ambient air or be evacuated (or be at another pressure) or may be partially or totally filled with an adhesive, e.g., epoxy, or other filling material, e.g., a polymer or silicone, or another material or may be not filled. As discussed hereinbefore, the inner diameter d6 of the tube 20 is about 0.01 to 10 microns larger than the diameter of the optical fiber 10, e.g., 125.01 to 135 microns. Other diameters may be used; however, to help avoid fiber buckling in this embodiment, the diameter d6 should be as close as possible to the fiber 10 outer diameter. Alternatively, the same result can be achieved by fusing two separate tubes on opposite sides of the grating 12 and then fusing an outer tube across the tubes, as discussed in the aforementioned copending U.S. patent application.

Figure 8:
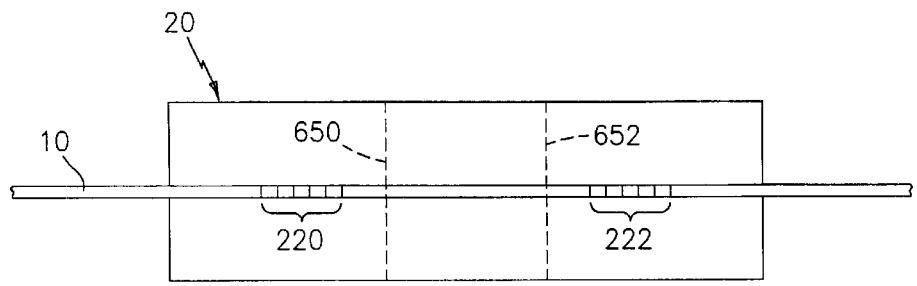
FIG. 8 is a side view of more than one grating on a fiber encased in a tube, in accordance with the present invention.

We have found that the present invention provides high repeatability, low creep and low hysteresis (e.g., about 3 picometers or less), depending on the configuration used. Referring to FIG. 8, for any of the embodiments described herein, instead of a single grating encased within the tube 20, two or more gratings 220,222 may be embedded in the fiber 10 that is encased in the tube 20. The gratings 220,222 may have the same reflection wavelengths and/or profiles or different wavelengths and/or profiles. The multiple gratings 220,222 may be used individually in a known Fabry Perot arrangement.

Further, one or more fiber lasers, such as that described in U.S. Pat. No. 5,666,372, "Compression-Tuned Fiber Laser" (which is incorporated herein by reference to the extent necessary to understand the present invention) may be embedded within the fiber 10 in the tube 20 and compression-tuned. In that case, the gratings 220,222 form a cavity and the fiber 10 at least between the gratings 220,222 (and may also include the gratings 220,222, and/or the fiber 10 outside the gratings, if desired) would be doped with a rare earth dopant, e.g., erbium and/or ytterbium, etc., and the lasing wavelength would be tuned accordingly as the force on the tube 20 changes.

Referring to FIG. 13, another type of tunable fiber laser that may be used is a tunable distributed feedback (DFB) fiber laser 234, such as that described in V. C. Lauridsen, et al, "Design of DFB Fibre Lasers", Electronic Letters, Oct. 15, 1998, Vol. 34, No. 21, pp 2028–2030; P. Varming, et al, "Erbium Doped Fiber DGB Laser With Permanent π/2 Phase-Shift Induced by UV Post-Processing", IOOC'95, Tech. Digest, Vol. 5, PD 1–3, 1995; U.S. Pat. No. 5,771,251, "Optical Fibre Distributed Feedback Laser", to Kringlebotn et al; or U.S. Pat. No. 5,511,083, "Polarized Fiber Laser Source", to D'Amato et al. In that case, the grating 12 is written in a rare-earth doped fiber and configured to have a phase shift of $\lambda/2$ (where $\lambda$ is the lasing wavelength) at a predetermined location 224 near the center of the grating 12 which provides a well defined resonance condition that may be continuously tuned in single longitudinal mode operation without mode hopping, as is known. Alternatively, instead of a single grating, the two gratings 220,222 may be placed close enough to form a cavity having a length of $(N+\frac{1}{2})\lambda$, where N is an integer (including 0) and the gratings 220,222 are in rare-earth doped fiber.

Alternatively, the DFB laser 234 may be located on the fiber 10 between the pair of gratings 220,222 (FIG. 8) where the fiber 10 is doped with a rare-earth dopant along at least a portion of the distance between the gratings 220,222. Such configuration is referred to as an "interactive fiber laser", as is described by J. J. Pan et al, "Interactive Fiber Lasers with Low Noise and Controlled Output Power", E-tek Dynamics, Inc., San Jose, Calif., internet web site www.e-tek.com/products/whitepapers. Other single or multiple fiber laser configurations may be disposed on the fiber 10 if desired.

Figure 9:
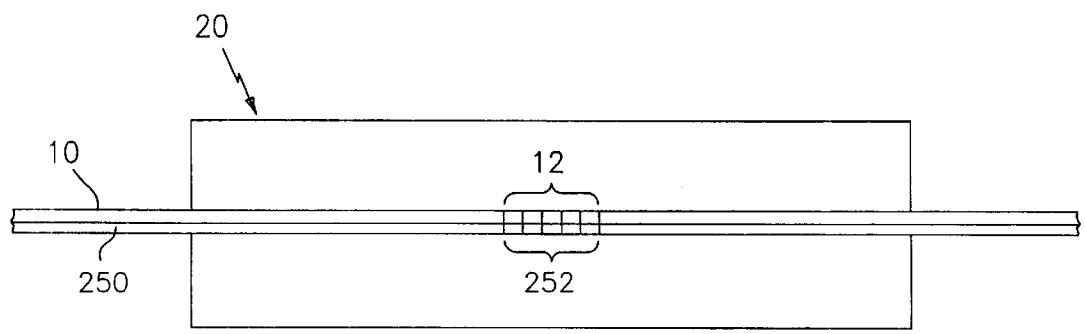
FIG. 9 is a side view of two fiber gratings on two separate optical fibers encased in a common tube, in accordance with the present invention.
Figure 10:
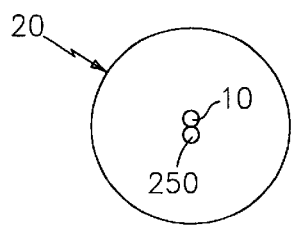
FIG. 10 is an end view of the embodiment of FIG. 9, in accordance with the present invention.

Referring to FIGS. 9 and 10, alternatively, two or more fibers 10,250, each having at least one grating 12,252 therein, respectively, may be encased within the tube 20. The gratings 12,252 may have the same reflection wavelengths and/or profiles or different wavelengths and/or profiles. In that case, the bore hole in the tube 20 prior to heating and fusing the tube 20 would be large enough to contain both fibers 10,250 and may be other than circular, e.g., square, triangle, etc. Also, the bore hole for the tube 20 need not be centered along the center line of the tube 20.

Figure 11:
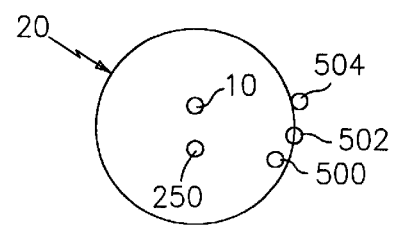
FIG. 11 is an end view of two fiber gratings on two separate optical fibers encased in a common tube and separated by distance, in accordance with the present invention.

Referring to FIG. 11, alternatively, instead of the fibers 10,250 touching each other as shown in FIG. 10, the fibers 10,250 may be spaced apart in the tube 20 by a predetermined distance. The distance may be any desired distance between the fibers 10,250 and have any orientation within the outer diameter of the tube 20. Also, for any of the embodiments shown herein, as discussed hereinbefore, part or all of an optical fiber and/or grating may be fused within, partially within, or on the outer surface of the tube 20, as illustrated by fibers 500,502,504, respectively.

Figure 12:
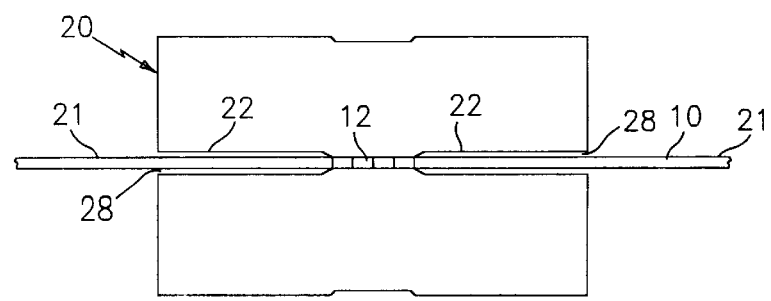
FIG. 12 is a side view of a tube-encased fiber grating where the tube is fused on the fiber only over the length of the grating, in accordance with the present invention.

Referring to FIG. 12, alternatively, the tube 20 may be fused onto the fiber 10 only where the grating 12 is located. In that case, if the tube 20 is longer than the grating 12, the inner tapered or flared regions 22 discussed hereinbefore may exist and the areas 28 between the tube 20 and the fiber 10 may be filled with a filler material, as discussed hereinbefore. Also, the term "tube" as used herein may also mean a block of material having the properties described herein.

Further, for any of the embodiments shown herein, instead of the fiber 10 passing through the housing 50,70,90 or the tube 20, the fiber 10 may be single-ended, i.e., only one end of the fiber 10 exits the housing or the tube 20. In that case, one end of the fiber 10 would be at or prior to the exit point of the fiber 10 from the tube 20 or the housing 50,70,90.

Figure 17:
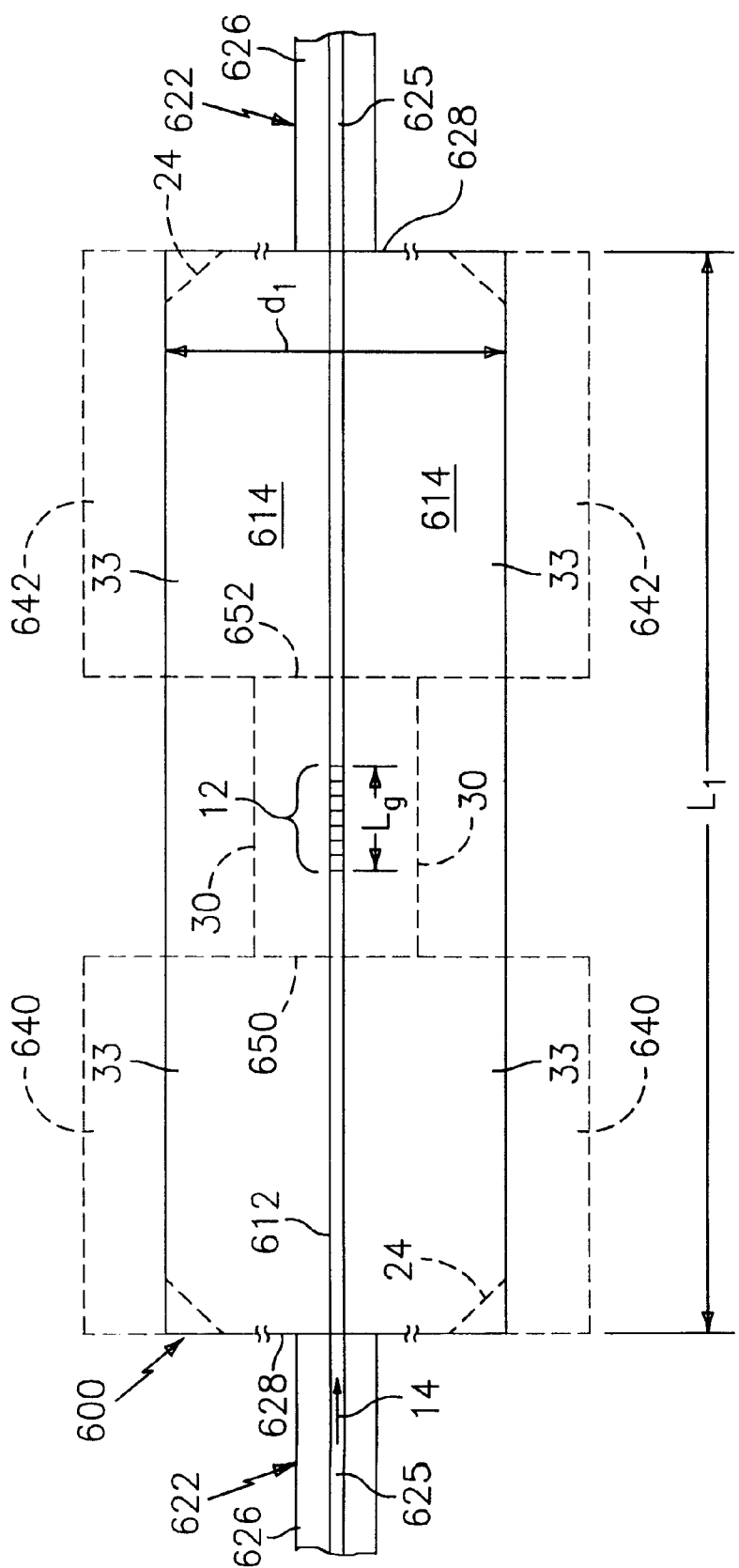
FIG. 17 is a side view of a large diameter optical waveguide having a grating disposed therein, in accordance with the present invention.

Referring to FIG. 17, alternatively, a portion of or all of the tube-encased fiber grating 20 may be replaced by a large diameter silica waveguide grating 600, such as that described in copending U.S. patent application Ser. No. 09/455,868, entitled "Large Diameter Optical Waveguide, Grating and Laser", which is incorporated herein by reference. The waveguide 600 has a core 612 (equivalent to the core of the fiber 10) and a cladding 614 (equivalent to the fused combination of the tube 20 and the cladding of the fiber 10) and having the grating 12 embedded therein. The overall length L1 of the waveguide 600 and the waveguide diameter d2 are set the same as that described hereinbefore for the tube 20 (i.e., such that the tube 20 will not buckle over the desired grating wavelength tuning range) and the outer diameter of the waveguide is at least 0.3 mm. An optical fiber 622 (equivalent to the fiber 10 in FIG. 1) having a cladding 626 and a core 625 which propagates the light signal 14, is spliced or otherwise optically coupled to one or both axial ends 628 of the waveguide 600 using any known or yet to be developed techniques for splicing fibers or coupling light from an optical fiber into a larger waveguide, that provides acceptable optical losses for the application.

The large diameter waveguide with grating 600 may be used in the same ways as the tube encased grating 20 is used herein where the fiber 10 is analogous to (and interchangeable with) the core 612 of the waveguide 600. For example, the waveguide 600 may be etched, ground or polished to achieve the "dogbone" shape described hereinbefore with the tube 20. Alternatively, the "dogbone" shape may be obtained by heating and fusing two outer tubes 640,642 onto opposite ends of the waveguide 600. All other alternative embodiments described herein for the tube 20 and the tube encased grating are also applicable to the waveguide 600 where feasible, including having a fiber laser or a DFB fiber laser, multiple fibers (or cores), various geometries, etc.

The tube-encased fiber grating 20 and the large diameter waveguide grating 600 may each also be referred to herein as a "tunable optical element". The tube encased grating 20 and the large diameter waveguide grating 600 have substantially the same composition and properties in the locations where the tube 20 is fused to the fiber 10, because the end (or transverse) cross-section of the tube-encased grating 20 and the large diameter waveguide grating 600 are contiguous (or monolithic) and made of substantially the same material across the cross-section, e.g., a glass material, such as doped and undoped silica. Also, in these locations both have an optical core and a large cladding.

Also, the waveguide 600 and the tube-encased grating 20 may be used together to form any given embodiment of the sensing element described herein. In particular, one or more axial portion(s) of the sensing element may be a tube-encased grating or fiber and/or one or more other axial portion(s) may be the waveguide 600 which are axially spliced or fused or otherwise mechanically and optically coupled together such that the core of said waveguide is aligned with the core of the fiber fused to the tube. For example, a central region of the sensing element may be the large waveguide and one or both axial ends may be the tube-encased fiber which are fused together as indicated by dashed lines 650,652, or visa versa (FIGS. 4,8,17).

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A compression-tuned optical device, comprising:
    a tunable optical element, having outer dimensions along perpendicular axial and transverse directions, said outer dimension being at least 0.3 mm along said transverse direction;
    said tunable optical element receiving and propagating input light and having at least one reflective element disposed therein along said axial direction, said reflective element reflecting a reflection wavelength of said input light;
    at least a portion of said tunable element having a transverse cross-section which is contiguous and comprises a substantially homogeneous material; and
    said reflective element being axially strain compressed so as to change said reflection wavelength without buckling said tunable element in said transverse direction thereby tuning said optical device.

2. The apparatus of claim 1 wherein said tunable element comprises
    an optical fiber, having said reflective element embedded therein; and
    a tube, having said optical fiber and said reflective element encased therein along a longitudinal axis of said tube, said tube being fused to at least a portion of said fiber.

3. The apparatus of claim 2 wherein said tube is fused to said optical fiber where said reflective element is located.

4. The apparatus of claim 2 wherein said tube is fused to said optical fiber on opposite axial sides of said reflective element.

5. The apparatus of claim 2, wherein said device further comprises a plurality of said optical fibers encased in said tube.

6. The apparatus of claim 2, wherein said inner core is a single mode core.

7. The apparatus of claim 1 wherein said tunable element comprises a large diameter optical waveguide having an outer cladding and an inner core disposed therein.

8. The apparatus of claim 7, wherein said device further comprises a plurality of said cores disposed in said wavguide.

9. The apparatus of claim 1 wherein said tunable element comprises:
    a tube fused to at least a portion of an optical fiber along a longitudinal axis of said tube;
    a large diameter optical waveguide having an outer cladding and an inner core disposed therein; and
    said tube and said wavguide being axially fused and optically coupled together.

10. The apparatus of claim 9 wherein said reflective element is disposed in said fiber and encased in said tube along said longitudinal axis of said tube.

11. The apparatus of claim 9 wherein said reflective element is disposed in said optical waveguide.

12. The apparatus of claim 1 wherein said material comprises a glass material.

13. The apparatus of claim 1, wherein said tunable element has a plurality of reflective elements disposed therein.

14. The apparatus of claim 1, wherein said tunable element has at least one pair of reflective elements disposed therein and at least a portion of said tunable element is doped with a rare-earth dopant between said pair of elements to form a laser.

15. The apparatus of claim 14 wherein said laser lases at a lasing wavelength which changes as force on said tunable element changes.

16. The apparatus of claim 1, wherein at least a portion of said tunable element is doped with a rare-earth dopant where said reflective element is located and said reflective element is configured to form a DFB laser.

17. The apparatus of claim 16 wherein said DFB laser lases at a lasing wavelength which changes as force on said tunable element changes.

18. The apparatus of claim 1, wherein said material comprises silica.

19. The apparatus of claim 1 wherein at least a portion of said tunable element comprises a cylindrical shape.

20. The apparatus of claim 1 wherein said tunable element has at least one tapered axial section.

21. The apparatus of claim 1 wherein said reflective element has a characteristic wavelength and wherein said tunable element comprises a shape that provides a predetermined sensitivity to a shift in said wavelength due to a change in force on said tunable element.

22. The apparatus of claim 21 wherein said shape of said tunable element comprises a dogbone shape.

23. The apparatus of claim 1, further comprising a compressing device, which axially compresses said waveguide element.

24. The apparatus of claim 23, wherein said compressing device comprises an actuator.

25. The apparatus of claim 23, wherein said compressing device comprises an actuator mechanically connected to at least one axial end of said tunable element.

26. The apparatus of claim 23, wherein said actuator comprises: a stepper motor, a piezoelectric actuator, a solenoid, or a pneumatic force actuator.

27. The apparatus of claim 23, wherein said compressing device comprises a housing surrounding at least a portion of said compressing device and said waveguide element.

28. The apparatus of claim 23, wherein said compressing device comprises a fluid-filled pressurized housing surrounding at least a portion of said waveguide element.

29. The apparatus of claim 1, wherein said outer dimension of said tunable element along said axial direction is greater than said outer dimension of said tunable element along said transverse direction.

30. A method for wavelength-tuning an optical device, comprising the steps of:
    a) obtaining a tunable optical element, having outer dimensions along perpendicular axial and transverse directions, said outer dimension being at least 0.3 mm along said transverse direction, said tunable optical element receiving and propagating input light and having at least one reflective element disposed therein along a longitudinal axis of said element, at least a portion of said tunable element having a transverse cross-section which is contiguous and comprises a substantially homogeneous material; and b) axially compressing said tunable element so as to change the reflection wavelength of said reflective element without buckling said tunable element in said transverse direction thereby tuning said optical device.

31. The method of claim 30 where said element comprises a tube, having an optical fiber and said reflective element encased therein along a longitudinal axis of said tube, said tube being fused to at least a portion of said fiber.

32. The method of claim 31, wherein said tube comprises a plurality of said optical fibers encased in said tube.

33. The method of claim 30 wherein said tunable element comprises a large diameter optical waveguide having an outer cladding and an inner core disposed therein.

34. The method of claim 33, wherein said waveguide comprises a plurality of said cores.

35. The method of claim 33, wherein said inner core is a single mode core.

36. The method of claim 30, wherein said tunable element has a plurality of reflective elements disposed therein.

37. The method of claim 30, wherein said tunable element has at least one pair of reflective elements disposed therein and at least a portion of said tunable element is doped with a rare-earth dopant between said pair of elements to form a laser.

38. The method of claim 37 wherein said laser lases at a lasing wavelength which changes as force on said tunable element changes.

39. The method of claim 30, wherein at least a portion of said tunable element is doped with a rare-earth dopant where said reflective element is located and said reflective element is configured to form a DFB laser.

40. The method of claim 39, wherein said DFB laser lases at a lasing wavelength which changes as said tunable element is compressed.

41. The method of claim 30 wherein said reflective element has a characteristic wavelength and wherein said tunable element has a shape that provides a predetermined sensitivity to a shift in said wavelength due to a change in force on said tunable element.

42. The method of claim 41 wherein said shape of said tunable element comprises a dogbone shape.

43. The method of claim 30 wherein said step of compressing comprises compressing said tunable element with an actuator.

44. The method of claim 43 wherein said actuator comprises: a stepper motor, a peizoelectric actuator, a solenoid, or a pneumatic force actuator.

45. The method of claim 30 wherein said step of compressing comprises compressing said tunable element with a fluid pressure.

46. The method of claim 30 wherein said material comprises a glass material.

47. The Method of claim 30, wherein said outer dimension of said tunable element along said axial direction is greater than said outer dimension of said tunable element along said transverse direction.

48. The Method of claim 30, wherein said material comprises silica.

* * * * *